(No Model.) 2 Sheets—Sheet 1.
L. BUSSE.
DUMPING WAGON.
No. 404,957. Patented June 11, 1889.
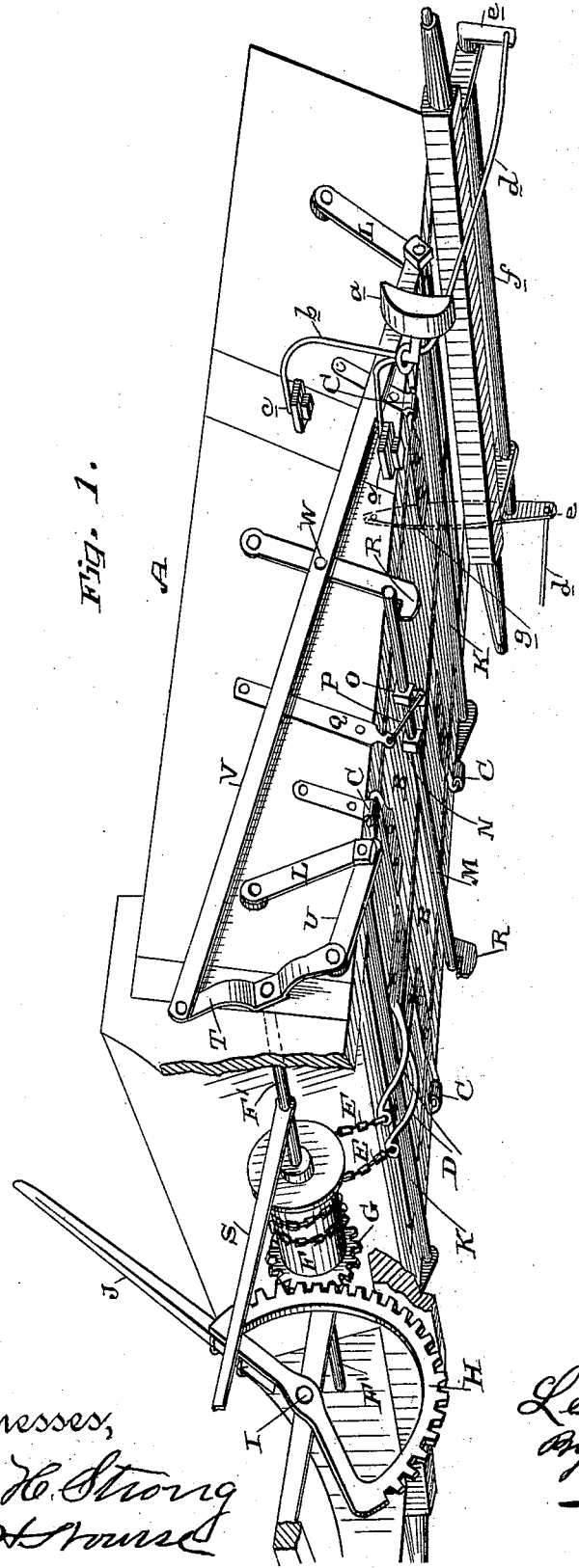
Witnesses,
Geo. H. Strong
Inventor,
Leopold Busse
By Dewey & Co.
atty (No Model.) 2 Sheets—Sheet 2.
L. BUSSE.
DUMPING WAGON.
No. 404,957. Patented June 11, 1889.
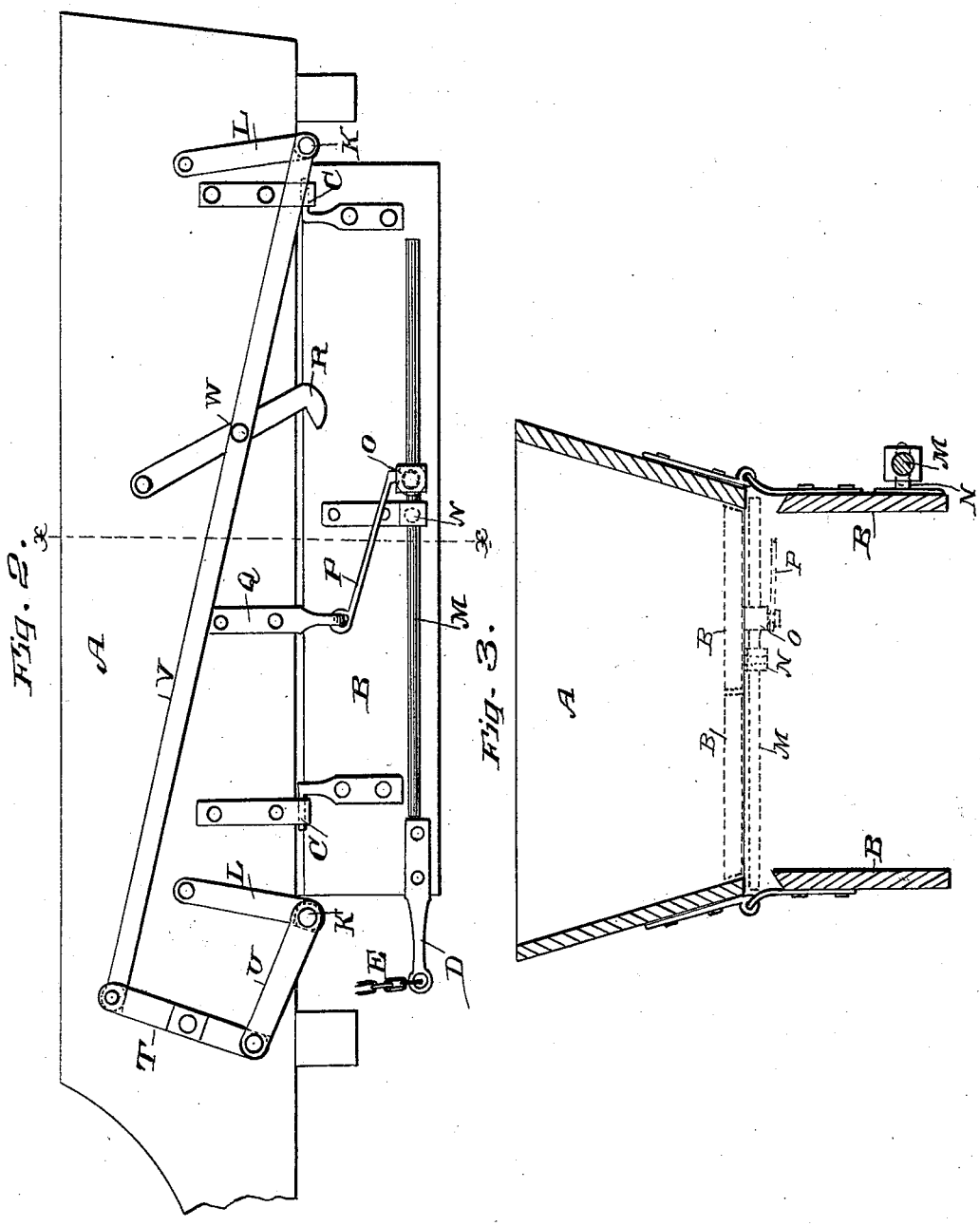
Witnesses,
Geo. H. Strong
J. B. Kruse
Inventor,
Leopold Busse
By Dewey & Co.
Attys

UNITED STATES PATENT OFFICE.

LEOPOLD BUSSE, OF SAN FRANCISCO, CALIFORNIA.

DUMPING-WAGON.

SPECIFICATION forming part of Letters Patent No. 404,957, dated June 11, 1889.

Application filed March 19, 1889. Serial No. 303,938. (No model.)

*To all whom it may concern:*

Be it known that I, LEOPOLD BUSSE, of the city and county of San Francisco, State of California, have invented an Improvement in Dumping-Wagons; and I hereby declare the following to be a full, clear, and exact description of the same.

My invention relates to certain improvements in dumping-wagons.

It consists of a wagon having a centrally-divided floor, the sections of which are hinged to the sides of the wagon-body, so as to swing outwardly and downwardly, and in combination therewith of a windlass and mechanism whereby the sections may be drawn up and closed after the load has been discharged, and a means for locking and unlocking the sections, together with certain details of construction, which will be more fully described hereinafter.

Referring to the accompanying drawings for a more complete explanation of my invention, Figure 1 is a perspective view of my dumping-wagon showing the mechanism underneath the body. Fig. 2 is a side view showing one of the hinged sections of the floor let down. Fig. 3 is a transverse section of the wagon on line *x x* of Fig. 2, with the hinged floor-sections let down.

A is the body of the cart or wagon, mounted upon axles and wheels in the usual or any suitable manner.

B B are the sections or bottom of the floor of the wagon, which are hinged at the sides as shown at C, and they swing about these hinges so as to open or close, meeting in the center when they are closed. Upon the forward ends of these sections are fixed stout projecting bars D, having eyes or suitable points for the attachment of chains E, which pass around the drum F of a windlass, which is journaled horizontally on a shaft F' in front of the wagon-body, as shown. Upon one end of this windlass-drum is a pinion G, and this pinion is engaged by a segmental rack H, which is pivoted, as shown at I, upon a suitable support fixed to the wagon-frame. By means of a lever J this segment may be turned so as to wind up the chains upon the windlass-drum and thus raise the hinged sections B of the bottom into a horizontal position and close the bottom up, or by turning the segment in the opposite direction the chains will be unwound and the sections forming the bottom will be allowed to swing down and open.

The lever J is preferably fitted to slide in and out of two eyes, which are fixed to the segment, so that the lever may be slipped through these eyes and out of the way when not in use.

In order to hold the bottom sections in place when they are closed, I employ bars K, which extend across the front and rear of the wagon-body and are suspended from its sides by swinging links L, so that these bars may be moved toward the front and rear, respectively, until they are clear of the ends of the bottom sections, or they may be correspondingly moved toward each other until they extend across beneath the ends of the hinged bottom sections, which they thus serve to support. The center of these sections is supported by a bar M, which is swiveled to one of the bottom sections B, near its inner edge, as shown at N.

O is a fixed point of attachment upon the bar M near the swiveled or pivoted support N, and from this point of attachment a rod P extends to the frame Q, which is fixed upon the side of the wagon-body. When the leaves B of the bottom are allowed to swing downward, the distance between the points O and Q will be shortened, and by means of the rod P this swivel-bar will be turned around so as to stand longitudinally and nearly parallel with the edge of the section B, to which it is pivoted, when the bottom sections are closed up and the reverse action takes place, and this bar is turned around until it stands transversely beneath the two bottom sections. It is held in this position by means of two hooks R, formed on the lower ends of links which are pivoted to the sides of the wagon-body, as shown. The hooks R and the locking-bars K, which support the ends of the bottom sections, are all operated simultaneously by means of a hand-lever S and supplemental levers and rods so connected with the different parts as to actuate them simultaneously.

For convenience and simplicity the drum F, around which the chain passes, is fitted loosely upon its supporting-shaft F', so that it turns independently upon it. The lever S is fixed to the shaft so as to turn the shaft when the lever is moved. The ends of the shaft pass through the sides of the wagon-body near the front, and have fixed upon their outer ends the lever-arms T. The lower end of each lever-arm is connected by a rod U with the end of the front locking-bar K, and the upper end of each of these lower arms is connected by a long side rod V with the rear locking-bar K. The central portion of this side rod V is pivoted at W to the suspended hook-rods R, so that by means of the lever S all these parts can be moved simultaneously. When the lever S is raised so as to turn the shaft F' and the exterior levers T, the operation will be to move the two end locking-bars K forward and backward, respectively, until the ends of the bottom sections are free to be dropped. At the same time the hooks R are moved backward until they release the central swiveled locking-bar M. The drum F being free to rotate, if there is a load in the wagon, the bottom sections will immediately swing downward by gravitation and discharge the load; or, if desired, the discharge may be controlled by means of the segment-rack and its lever. After the load is discharged by means of this segment-rack and lever the drum is rotated so as to coil up the chains and raise the bottom sections B into their proper position, after which the lever S is moved down and through the lever T, and the connecting-rods will force the locking-bars K beneath the ends of the sections B, while the swiveled bar M, which is turned, as before described, by the closing of the sections, is engaged by hooks R, and the bottom is thus supported at three points, which makes it very firm and rigid.

It will be manifest that on account of this swinging bottom the front and rear axles must be supported so far apart as to allow the bottom to swing between them, and for the same reason it will be impossible to employ a brake-beam in the usual manner, passing across beneath the wagon-body just in front of the rear wheel-rims. In order to overcome this difficulty, I support the brake-shoes $a$ from the frames $b$, which are hinged upon the sides of the wagon, as shown at $c$, so that by moving them forward and back the brake-shoes, which are attached to them, will be moved out of or into contact with the wheel-arms. From the lower ends of these swinging arms rods $d$ extend backwardly beneath the rear axles and connect with the crank-arms $e$ upon the shaft $f$, which is journaled behind the rear axle of the wagon, as shown. Upon one side of the wagon a lever-arm $g$ extends upward from this shaft, and is connected by a rod with the usual brake-lever, which is within reach of the wagon-driver. This mechanism gives me perfect control over the wagon, and at the same time places the brake mechanism entirely out of the way of the swinging bottom boards.

Having thus described my invention, what I claim as new, and desire to secure by Letters Patent, is—

1. In a dumping-wagon, a bottom composed of sections hinged to the sides and meeting when closed at the center, arms extending from these hinged sections, a drum, and chain coiled around said drum and connecting with the arms of the sections, in combination with the pinion, segment, and operating-lever, whereby the chains may be coiled or uncoiled, substantially as herein described.

2. In a dumping-wagon, bottom sections hinged to the sides and closing toward the center, the winding-drum and actuating mechanism, and chains connecting said drum with the sections, whereby they may be closed by the rotation of the drum, in combination with locking-bars suspended by links from the sides of the wagon-body, so as to swing beneath the ends of the bottom sections when they are closed, substantially as herein described.

3. In a dumping-wagon, the hinged bottom sections closing toward the center, the winding-drum and operating mechanism whereby they are closed, and the horizontal bars suspended from the sides of the wagon and adapted to swing to and from each other, so as to lock or unlock the bottom sections, in combination with the connecting-rods and levers whereby the locking-bars are moved simultaneously, substantially as herein described.

4. The hinged centrally-meeting bottom sections, with mechanism for opening and closing the same, and the end locking-bars with connecting-levers, as shown, in combination with a central bar pivoted to one of the sections near its swinging edge, and the rod connecting said bar with a stationary point upon the side of the wagon, so that the bar is turned into a longitudinal position when the bottom sections begin to open and is turned into a transverse position beneath the sections when they are closed, substantially as herein described.

5. The hinged bottom sections closing toward the center, with the operating-drum and the end locking-bars and the central swiveled bar, in combination with the levers, and connecting-rods whereby the end bars are moved to lock or unlock the bottom sections, and the hooks R, which are moved simultaneously to engage or disengage with the ends of the central swiveled bar, substantially as herein described.

In witness whereof I have hereunto set my hand.

LEOPOLD BUSSE.

Witnesses:
LINCOLN SONNTAG,
FELIX KIVI.